United States Patent
Mehta et al.

(10) Patent No.: US 10,053,821 B2
(45) Date of Patent: Aug. 21, 2018

(54) ASPHALT CONCRETE HAVING A HIGH RECYCLED CONTENT AND METHOD OF MAKING THE SAME

(71) Applicant: Rowan University, Glassboro, NJ (US)

(72) Inventors: Yusuf Mehta, Glassboro, NJ (US); Prashant Shirodkar, Glassboro, NJ (US); Khyati Sonpal, Glassboro, NJ (US); Aaron Nolan, Glassboro, NJ (US)

(73) Assignee: Rowan University, Glassboro, NJ (US)

( * ) Notice: Subject to any disclaimer, the term of this patent is extended or adjusted under 35 U.S.C. 154(b) by 0 days.

(21) Appl. No.: 15/520,548

(22) PCT Filed: Oct. 20, 2015

(86) PCT No.: PCT/US2015/056392
§ 371 (c)(1),
(2) Date: Apr. 20, 2017

(87) PCT Pub. No.: WO2016/064826
PCT Pub. Date: Apr. 28, 2016

(65) Prior Publication Data
US 2017/0314211 A1    Nov. 2, 2017

Related U.S. Application Data

(63) Continuation of application No. 14/518,682, filed on Oct. 20, 2014, now abandoned.

(51) Int. Cl.
*E01C 11/00* (2006.01)
*B01F 15/04* (2006.01)
*B28C 5/00* (2006.01)
*B01F 15/06* (2006.01)

(52) U.S. Cl.
CPC ......... *E01C 11/00* (2013.01); *B01F 15/0441* (2013.01); *B01F 15/06* (2013.01); *B28C 5/003* (2013.01); *B01F 2015/062* (2013.01); *B01F 2215/0063* (2013.01)

(58) Field of Classification Search
CPC  E01C 11/00; B01F 15/0441; B01F 2015/062; B01F 2215/0063; B28C 5/003
USPC ..................................... 404/17, 72
See application file for complete search history.

(56) References Cited

U.S. PATENT DOCUMENTS

| | | |
|---|---|---|
| 5,405,440 A | 4/1995 | Green et al. |
| 5,766,333 A | 6/1998 | Lukens |
| 8,962,071 B2 | 2/2015 | Reinke et al. |
| 2012/0213584 A1 | 8/2012 | Reinke et al. |
| 2013/0195552 A1 | 8/2013 | McDade et al. |
| 2013/0336720 A1 | 12/2013 | Jack et al. |
| 2015/0110556 A1 | 4/2015 | Kadrmas et al. |

*Primary Examiner* — Raymond W Addie
(74) *Attorney, Agent, or Firm* — Saul Ewing Arnstein & Lehr LLP; Brian R. Landry; Domingos J. Silva

(57) ABSTRACT

A method of making asphalt concrete mixtures including reclaimed asphalt pavement (RAP). Variability in the fraction of binder that occurs in RAP that is able to melt and mix with virgin binder included in the concrete mixture previously made it difficult to select an appropriate amount of virgin binder. Methods described herein permit an asphalt concrete mix designer to determine the amount of virgin binder that can be combined with RAP and virgin aggregate in order to satisfy the minimum effective binder content of a job mix formula for such a concrete mix. The subject matter described herein thus permits more efficient use of RAP and permits use of RAP in higher amounts in asphalt concrete mixtures.

15 Claims, No Drawings

ASPHALT CONCRETE HAVING A HIGH RECYCLED CONTENT AND METHOD OF MAKING THE SAME

CROSS-REFERENCE TO RELATED APPLICATIONS

This application is the U.S. National Phase of International Application No. PCT/US2015/056392, filed Oct. 20, 2015, which claims priority to U.S. patent application Ser. No. 14/518,682, filed Oct. 20, 2014, the disclosures of which is incorporated herein by reference in their entirety.

BACKGROUND OF THE DISCLOSURE

The disclosure relates generally to the field of paving and formulation materials useful for paving surfaces.

Asphalt concretes are sturdy, weather resistant materials that can be used to pave surfaces at relatively low cost. Among the known advantages of asphalt concretes are their ability to support heavy pedestrian and vehicular traffic with substantial durability and wear resistance. Asphalt concretes can also be recycled, in that asphalt concrete removed from existing paved surface can be disintegrated and the resulting pieces (reclaimed asphalt pavement or "RAP") can be incorporated into fresh asphalt concrete as it is being prepared and laid.

Asphalt concretes are mixtures of one or more bituminous binder materials ("binders") with one or more aggregate materials ("aggregates"), the mixture typically being composed of about 93%-95% by weight aggregate. Asphalt refers to a highly viscous, tar-like substance of petrochemical origin that is also commonly known as bitumen. Asphalt occurs naturally and is a common product of petrochemical fractionation. Petrochemical asphalt can be supplemented with polymers of various known sorts in order to improve various properties (e.g., one or more of resistance to rutting, thermal cracking, fatigue damage, stripping, and temperature susceptibility) of asphalt concrete which incorporates such polymer-modified asphalts. Use of asphalt as a binder in asphalt concrete paving materials represents the predominant use of asphalt, at least in the United States of America and many other industrialized nations.

A wide variety of materials can be used as aggregate fillers in asphalt concretes. Minerals such as crushed gravels and sands are common aggregates used in manufacture of asphalt concrete paving materials. RAP is also commonly used as an aggregate, RAP being able to contribute both its aggregate fraction and any bituminous binder that remains functional.

Recycling of asphalt-based paving mixtures most commonly occurs in two contexts. First, a common method of recycling ("hot mix recycling") involves combining RAP with virgin aggregate and new binder (i.e., binder not recovered from the RAP) in a central mixing plant to produce a hot mix-type paving mixtures. In hot mix recycling, RAP can be stored for a period of time prior to its use in a recycled mixture. A second method ("hot in-place recycling") involves softening an existing asphalt concrete-paved surface by heating it, mechanically removing some or all of the softened pavement, mixing the removed material with additional new binder, virgin aggregate, or both, and repaving the surface using the resulting mixture (i.e., generally without removing the recycled material from the pavement site).

Incorporation of RAP into recycled asphalt concretes is known and has been performed for years. However, use of RAP presents a serious difficulty regarding how the resulting recycled asphalt concrete should be formulated. RAP is derived from previously-produced asphalt concrete and therefore includes both the aggregate and binders and binder-derived products that occur in the previous concrete. Determination of the aggregate composition of RAP tends to be relatively simple, in that any binder or binder-derived products can usually be burned off from a sample of the RAP, leaving substantially only the aggregate. However, determining the amount and utility of binder and binder-derived products in RAP is more complicated.

Asphalt binders (and asphalt concretes including them) are known to oxidize and become stiffer over time as they are exposed to sunlight, temperature changes, and other environmental conditions. In addition to environmental factors, changes in asphalt stiffness and other properties are known to correlate with the initial chemical composition of the asphalt binder, with compounds mixed with the binder (e.g., polymer additives intended to affect concrete properties), and to chemical treatments (e.g., asphalt maintenance procedures and reagents) to which the asphalt is subjected during its use. For at least these reasons, the precise chemical species of binders and binder-products and their relative proportions are not known in RAP. In RAP prepared from freshly-laid asphalt concrete, for example, properties of the binder fraction of the RAP should approximately mirror those of the binders used to form the concrete. However, as the asphalt concrete ages and is subjected to environmental and use conditions, the chemical composition—and hence the properties—of the binder fraction of the RAP can diverge significantly from the composition (and properties) of the original binder. Furthermore, because different portions (e.g., upper surface, interior, and soil-contacting surface) of an asphalt concrete can experience different environmental and use-related stresses, the properties of the binder fraction of RAP can differ within the recycled pavement. Thus, the binder fraction of RAP may exhibit properties which range from the properties of virgin binder to properties of a material that has become so stiff and non-reactive that it acts essentially as an inert "black rock" in an asphalt concrete mixture.

The strength and load-bearing capacity of asphalt concretes are largely attributable to their aggregate components, and these properties of recycled asphalts can be predicted with high reliability based on knowledge of virgin and RAP aggregates. However, the cohesive strength and resistance to degradation and wear are properties that are largely attributable to the binder component(s) of an asphalt concrete. Careful selection and control of binders and their properties is important for formulating practical asphalt concretes.

Difficulties in predicting the properties of the binder component of RAP have led users of RAP to limit the amount of RAP included in recycled asphalt concrete mixtures. A user who over-estimates the degree to which the binder component of RAP acts like virgin binder risks producing asphalt concrete which exhibits low strength and wear resistance. On the other hand, a user who under-estimates the degree to which the binder component of RAP acts like virgin binder risks producing asphalt concrete which is both more expensive than it needs be (asphalt binders and polymer supplements generally being much more expensive than aggregates) and potentially exhibits lower strength and wear resistance than desired.

On account of these shortcomings, practically useful methods of recycling asphalt have generally been limited to those in which not more than about 15% by weight RAP is incorporated into a new asphalt concrete mix. The present disclosure relates to ways of overcoming shortcomings in this field whereby asphalt concrete mixtures having beneficial performance characteristics can be made containing RAP in amounts far in excess of 15% by weight.

BRIEF SUMMARY OF THE DISCLOSURE

The disclosure relates to methods of making asphalt concrete mixtures that include a reclaimed asphalt pavement (RAP) and that has a job mix formula (JMF). The JMF specifies an amount of aggregates, gradation of the aggregates, and at least a selected minimum effective binder content (MEBC). The methods involve combining a virgin binder (e.g., an asphalt or a polymer-supplemented asphalt), a virgin aggregate, and the RAP in selected amounts. The sum of the amounts of aggregates in the virgin aggregate and the RAP is equal to the amount of aggregates specified in the JMF. The gradation of aggregates in the combined virgin aggregate and the RAP satisfies the gradation specified in the JMF. The amount of virgin binder is at least equal to the difference between the MEBC and the working binder content (WBC) of the RAP.

In one embodiment, the WBC of the RAP is determined by assuming an estimated degree of partial blending (EDPB) for the RAP and then performing an iterative procedure that includes the steps of:

1) determining a virgin binder content (VBC) by subtracting the product (EDPB×total binder content of RAP) from the MEBC;
2) preparing, mixing, and heating above the melting point of the virgin binder a test sample consisting of virgin binder, a coarse fraction of the virgin aggregate, and a fine fraction of the RAP in amounts wherein
   a) the sum of the amounts of the coarse fraction of the virgin aggregate and the fine fraction of the RAP is equal to the amount of aggregates specified in the JMF; and
   b) the amount of virgin binder is VBC;
3) thereafter separating the coarse and fine fractions
4) determining:
   a) a binder property ("A(Virgin_Agg)$_{blend\_binder}$") for binder that coats aggregate in the coarse fraction;
   b) the same binder property ("A(RAP_Agg)$_{blend\_binder}$") for binder that coats aggregate in the fine fraction;
   c) the same binder property ("A$_{virgin\_binder}$") of the virgin binder; and
   d) the same binder property ("A$_{RAP\_virgin\_binder\_0\_blend}$") of a binder sample prepared by combining extracted RAP binder and virgin binder in amounts corresponding to the relative thicknesses of the RAP binder layer and the virgin binder layer that would be expected to coat RAP aggregate particles under zero blending conditions, based on Bailey's calculation method;
5) calculating a calculated degree of partial blending (CDPB) according to the following formula Degree of partial blending (%) =

$$100\left(1 - \frac{|A(\text{Virgin\_Agg})_{blend\_binder} - A(\text{RAP\_Agg})_{blend\_binder}|}{|A_{virgin\_binder} - A_{RAP\_virgin\_binder\_0\_blend}|}\right)$$

6) comparing EDPB and CDPB and
   a) if (|CDPB−EDPB|/CDPB) is not greater than 0.15, then calculating WBC as the product (CDPB×total binder content of RAP) or else
   b) setting EDPB equal to CDPB and repeating steps 1-6.

The asphalt concrete mixture preferably includes at least 25% by weight RAP, more preferably at least 35% by weight RAP.

The binder property that is determined in the iterative method can, for example, be G*/sin(delta) or G*×sin(delta), G* or delta.

EDPB can initially be assumed to be 60%. Alternatively, EDPB can be initially assumed to be DOB, wherein $$DOB = 39.756 + 11.592(\text{AC}_{RAP}) - 1.433(PP\#200_{RAP}) - 3.764\left[\left(\frac{G^*}{\sin(\delta)}\right)_{RAP\ Binder} - \left(\frac{G^*}{\sin(\delta)}\right)_{Virgin\ Binder}\right]$$

and wherein:

$\text{AC}_{RAP}$ is the asphalt content of the RAP, expressed as a percentage by weight;

$PP\#200_{RAP}$ is the percentage of the RAP particles able to pass through a US Standard No. 200 sieve, expressed as a percentage by weight;

$$\left(\frac{G^*}{\sin(\delta)}\right)_{RAP\ Binder}$$

is a property of RAP binder at a selected temperature; and $$\left(\frac{G^*}{\sin(\delta)}\right)_{Virgin\ Binder}$$

is a property of the virgin binder at the same selected temperature.

Step 6 of the iterative method can be performed such that:
a) if (|CDPB−EDPB|/CDPB) is not greater than 0.10, then WBC is calculated as the product (CDPB×total binder content of RAP) or else
b) setting EDPB equal to CDPB and repeating steps 1-6.

Step 6 of the iterative method can alternatively be performed such that:
a) if (|CDPB−EDPB|/CDPB) is not greater than 0.05, then WBC is calculated as the product (CDPB×total binder content of RAP) or else
b) setting EDPB equal to CDPB and repeating steps 1-6.

The asphalt concrete mixture made or designed using the method described herein can be used to pave a surface, such as a roadway.

DETAILED DESCRIPTION

The disclosure relates to methods of designing and making asphalt concrete mixtures that include substantial amounts of reclaimed asphalt pavement (RAP), which is a material generated upon removal of asphalt from previously-paved surfaces. Such removal typically occurs upon repaving of a paved surface, and tends to limit increases in the thickness of the pavement, smooth the surface to be repaved, and expose substrate material suitable for attachment of new asphalt. As a result of such removal, significant amounts of RAP are generated, and these materials can be re-used in new asphalt pavement, either at the same site from which the RAP was removed or (often after storage) in asphalt concrete mixtures applied at a different site.

Variability in the composition and properties of RAP cause unpredictability of properties of asphalt concrete mixtures which incorporate the RAP, particularly in regard to the amount of bituminous binders that are present in and able to act, functionally, as binders in the RAP-containing mixture. Because RAP is derived from asphalt concrete, RAP contains bituminous binders. However, because asphalt concretes from which RAP are derived vary enormously in their initial compositions and the environmental and wear conditions to which they have been exposed, it is difficult to predict how much, if any, of the binder(s) originally present in the asphalt concrete-derived RAP remain available to be re-used as binders in a new asphalt concrete mixture incorporating the RAP.

It is important that the binder content of an asphalt concrete mixture not be under-estimated, lest the pavement fail to exhibit the physical and structural characteristics desired by its designer. Owing to the difficulty in understanding the fraction of binder present in RAP that can functionally act as a binder when the RAP is incorporated into an asphalt concrete mix, many designers and customers have set cautious limits on the quantities of RAP that they will permit to be incorporated into asphalt concrete mixtures. As a result, actual usage of RAP falls short of the utilization of this resource that could be achieved if the effective binder content of RAP (i.e., the amount of binder in RAP that acts as a binder when the RAP is recycled into an asphalt concrete mixture) could be more accurately estimated. Consequences of underutilization of RAP include increased cost of paving (i.e., since virgin materials are generated and used in place of cheaper recycled materials) and greater accumulation of RAP (i.e., a generally unsightly material which is undesirable in many environments owing to odors and ground water pollutants which can emanate therefrom, for example).

The subject matter disclosed herein is directed to methods of accurately estimating the effective binder content of RAP to thereby enhance the ability of asphalt concrete designers to use RAP in asphalt concrete mixes having predictable properties. The methods described herein can be expected to increase the amount of RAP that can be incorporated into an asphalt concrete mix without rendering unpredictable the physical and structural properties of pavement made from the mix.

In the past, the U.S. federal Strategic Highway Research Program conducted research to develop reliable ways to specify, test, and design asphalt materials. The final product of the SHRP asphalt research program was a system referred to as SUPERPAVE, which is an abbreviation for SUperior PERforming asphalt PAVEments. SUPERPAVE is an art-recognized system for specifying the components of asphalt concrete, asphalt concrete mixture design and analysis, and asphalt pavement performance prediction. The SUPERPAVE Performance Graded (PG) system is a method of measuring asphalt binder performance.

The SUPERPAVE PG method classifies asphalt binders into performance grades that change at 6-degree-Celsius intervals, corresponding to expected maximum and minimum environmental temperatures in which an asphalt binder is considered acceptable for use. PG grade is reported as a pair of numbers, such as 64-22 (corresponding to a use when maximum pavement temperature is below 64 degrees Celsius and above a minimum temperature of −22 degrees Celsius).

The primary purpose of classifying asphalt binders using the SUPERPAVE PG system is to enable asphalt concrete designers to select a binder having properties suitable for an expected environment. Using this information, a designer can predictably design an asphalt concrete mix that will exhibit structural properties considered desirable for a particular paving application.

The physical and structural properties of asphalt pavements derive from the properties of the aggregates and binders of the pavement and the interactions between these components. The resilience and cohesiveness properties of a pavement tend to derive from the properties of the binder(s) which connect the aggregate particles. A designer must therefore be able to reliably predict the amount of binder present in an asphalt concrete mix. When a mix is made from all virgin materials, binder content can be determined with great accuracy. However, when recycled binder-containing materials such as RAP are incorporated into the mix, the binder content of the mix depends both on the amount of virgin binder added to the mix and on the amount of binder that is present in the RAP and still capable of acting as a binder. The adhesive and cohesive properties of many binders degrade over time, at rates which depend on unpredictable factors such as environmental, mechanical, and chemical stresses to which the binders have been subjected. As a result, it is practically impossible to predict the fraction of binder that is present in RAP that retains adhesive and cohesive properties sufficient to permit it to continue to function as a binder. It is to this difficulty that the methods described herein are directed.

The methods described herein permit a designer to determine the fraction of binder present in a sample of RAP that will act as a free or effective binder when the RAP is incorporated into a new asphalt concrete mixture. Armed with this knowledge and the knowledge of the total effective binder content that is desired for the new mixture, a designer can calculate the amount of virgin binder that must be added to a combination of RAP and virgin aggregates to achieve design specifications in a job mix formula.

The methods described herein, crudely considered, involve combining coarse virgin aggregate, fine RAP aggregate (i.e., particles of RAP smaller than the virgin aggregate particles), and virgin binder; mixing these components in a heated state;

separating the coarse and fine aggregates (each of which is now coated with virgin binder and/or with RAP-derived binder); and assessing how much virgin binder and/or RAP-derived binder is associated with each of the coarse and the fine aggregate particles. From this assessment (and from assessment of the pure virgin binder and the mixed binder populations), one using these methods can determine how much RAP-derived binder transferred from the fine RAP aggregate particles to the virgin aggregate particles. This information (combined with knowledge of how the virgin binder would be expected to distribute among the particles in the absence of any transfer of RAP-derived binder) informs a designer about the fraction of binder present in the RAP that can be expected to contribute to the binding properties of a mixture including the RAP. If more precise information about this fraction is needed, the method can be repeated (several times if necessary or desired), each time adjusting the amount of virgin binder used in the coarse/fine aggregate mixture to account for the fraction of RAP-derived binder that was mobilized in the previous iteration.

More specifically, the methods described herein for determining the contribution of RAP-derived binder to effective binder content in an asphalt concrete mixture having a selected job mix formula (JMF) are performed as follows.

The quantity and properties (including at least the continuous grade) of binder contained in the RAP is determined, as are the quantity and gradation of aggregate in the RAP. Using these determined values and selecting an initial estimate (e.g., 60%) for the degree of partial binding for the RAP binder, a test formulation satisfying the JMF criteria is generated by combining RAP, virgin aggregate, and virgin binder. Significantly, RAP particles that are included in the test formulation are limited to those which have a size smaller than a selected screen sieve size (e.g., only RAP particles able to pass through a US Standard No. 8 sieve), and virgin aggregate particles are limited to those which have a size greater than the included RAP particles (e.g., only virgin aggregate particles which are unable to pass through a US Standard No. 8 sieve or, alternatively, only virgin aggregate particles unable to pass through a No. 4 sieve). The differentiable sizes of RAP and virgin aggregate particles permits those particles to be separated from one another after the test formulation has been generated, heated, and mixed.

Ultimately, analysis of binder adhered to the two types of aggregate particles in the test formulation permits calculation of an updated estimate of the degree of partial binding for the binder that is present in the RAP. That updated estimate can, in a second iteration of the testing method, be substituted for the initially estimated value to obtain a second updated estimated value which will be nearer the actual degree of partial binding than each of the first updated estimated value and the initially estimated value. The testing method can be repeated for as many iterations as desired or necessary to obtain a sufficiently precise value for the degree of partial binding for RAP binder that the JMF can be prepared with confidence that the calculated amount of useful binder in the RAP will actually be contributed by RAP included in the JMF.

In order to determine an updated estimated value for the degree of partial binding in the RAP, each test formulation (i.e., in each iteration of the testing method that is performed) is assessed as follows.

The RAP particles, the virgin aggregate, the virgin binder, in a mixing apparatus (e.g., an asphalt mixer) are pre-heated to a testing temperature sufficient to melt available binder (e.g., 350 degrees Fahrenheit). The components are combined and mixed at the testing temperature for a selected period of time, preferably at least about half an hour. The mixed components are then maintained at a temperature above the expected melting point of the binders (e.g., at or above 135 degrees Celsius) to simulate paving conditions. After this mixing procedure, the virgin and RAP aggregate materials are separated from one another, based on the size difference between the particles used. The binder adhered to the particles at this point will ordinarily be a blend of the virgin binder and binder derived from the RAP. The binder fractions adhered to each of the virgin aggregate particles and the RAP-derived aggregate particles are separately extracted from the corresponding aggregate particles and analyzed. The SUPERPAVE PG properties and continuous grade of each extracted binder aliquot are separately determined.

The proportions of the virgin binder that would be expected to coat each of the RAP-derived aggregate and the virgin aggregates at the zero blending condition are calculated using Bailey's method and estimated based on the surface area of the corresponding aggregates. Bailey's method is described, for example, at "Bailey Method for Gradation Selection in Hot-Mix Asphalt Mixture Design," U.S. National Research Council Transportation Research Board Transportation Research E-Circular Number E-C044, October 2002, ISSN 0097-8515. (Under zero blending conditions, virgin binder would be expected to coat both the virgin and RAP aggregates and the RAP binder would be expected to coat only the RAP aggregates.) Based on the measured percentage of binder in the RAP and the sizes of the RAP aggregates, approximate film thickness around the RAP is calculated (still, that is, assuming that there is zero blending). A similar calculation is done to determine film thickness of virgin binder around the RAP aggregates. The ratio of the film thickness of virgin binder and the RAP binder around the RAP aggregates under zero-binding conditions determines the proportions of the RAP-extracted and the virgin binder to be used in the next step.

Aliquots of RAP-extracted binder and virgin binder are combined in the proportion described in the preceding paragraph to form a zero-blending-assumption (ZBA) mixture. The SUPERPAVE PG properties of the ZBA mixture are determined.

An updated estimate of the degree of partial binding of the RAP-derived binder can then be calculated by applying the following formula.

$$\text{Degree of partial blending (\%)} = 100\left(1 - \frac{|A(\text{Virgin\_Agg})_{blend\_binder} - A(\text{RAP\_Agg})_{blend\_binder}|}{|A_{virgin\_binder} - A_{RAP\_virgin\_binder\_0\_blend}|}\right)$$

In this formula, "A" refers to a mechanical property of binders, such as G*sin(delta) for a particular binder. The term $A(\text{Virgin\_Agg})_{blend\_binder}$ refers to that property of blended binder obtained from coated virgin aggregates, $A(\text{RAP\_Agg})_{blend\_binder}$ refers to that property of blended binder obtained from coated RAP aggregate, $A_{virgin\_binder}$ refers to that property of virgin binder, and $A_{RAP\_virgin\_binder\_0\_blend}$ refers to that property of the ABA mixture described above.

If this updated estimate of the degree of partial blending is considered sufficiently accurate (i.e., it is considered near enough to the initial estimate, for the first iteration of the method, or to the estimated value calculated in the preceding iteration, for all other iterations, that the difference is considered inconsequential to formulation of the JMF), then the updated estimate can be considered, for JMF design purposes, to be the degree of partial blending for available binder in the RAP. If the updated estimate is not considered sufficiently accurate, then the method can be repeated, using the updated estimate in place of the initial estimate for the degree of partial blending, in order to obtain a more accurate estimate.

Using the method described herein for accurately assessing the degree of partial blending that can be achieved using binder present in RAP permits a skilled artisan in this field to incorporate a greater proportion of RAP into a JMF. Using this method, RAP contents of 35% by weight or more can be incorporated into a JMF without sacrificing asphalt performance. Thus, the method both facilitates use of large amounts of RAP, which would otherwise need to be stored, thereby exposing the environment to release of harmful components of RAP. The methods also permit use of binder present in RAP, alleviating the need to generate and use virgin binder in asphalt.

EXAMPLES

The subject matter of this disclosure is now described with reference to the following Examples. These Examples are provided for the purpose of illustration only, and the subject matter is not limited to these Examples, but rather encompasses all variations which are evident as a result of the teaching provided herein.

Example 1

Methodology to Determine Degree of Blending

The following methodology can be used to determine the degree of partial blending in an asphalt concrete mixture including a RAP and having a selected job mix formula (JMF; i.e., a recommended mixture of aggregate and asphalt binder which also specifies aggregate gradation and asphalt binder type).

Step 1. The binder content of the RAP (e.g., grams of binder per kilogram of RAP) and the gradation of the extracted aggregates are each determined. Binder content can be determined, for example, by subjecting the RAP to incineration and determining the percentage of RAP weight that is consumed upon incineration (this percentage is equated to the binder content, and includes both effective binder and binder-derived products that do not function as effective binder). RAP gradation can be determined using any standard method, such as by sieving, preferably after extraction or incineration of binder from the RAP.

Step 2. The SUPERPAVE PG properties and continuous grade of the RAP binder are determined using the testing procedures specified in AASHTO M320 ("Standard Specification for Performance-Graded Asphalt Binder" of the American Association of State and Highway Transportation Officials, 2010). The continuous or performance grade of the virgin binder is noted (generally from materials provided by the supplier of the virgin binder).

Step 3. An aggregate mixture is designed wherein i) all fine aggregates (i.e., those able to pass through a US standard No. 8 sieve {2.36 millimeter}) are taken from the RAP; ii) all coarse aggregates (i.e., those unable to pass through a US standard No. 4 sieve {4.75 millimeter}) are virgin aggregates; iii) the gradation of the aggregate mixture is substantially the same as the gradation of the selected JMF; and iv) the RAP working binder (RWB) content of the designed mixture can be obtained by multiplying the amount of RAP by the RAP binder content. If the desired pavement is being designed using SUPERPAVE design principles, then the aggregate mixture should further satisfy the corresponding SUPERPAVE aggregate design specifications.

Step 4. A design binder content (DBC) is determined based on the SUPERPAVE mixture design (i.e., according to the design criteria set forth in AASHTO M323 Standard Specification for Superpave Volumetric Mix Design). If the desired pavement is not being designed using SUPERPAVE design principles, then the design binder content can be taken from the JMF.

Step 5. The virgin binder content (VBC) necessary to achieve the DBC in the designed mixture is determined from the following equation: VBC=DBC−RAP working binder (RWB). The value of RWB depends on the degree of partial blending (DPB) exhibited by binder in the RAP. Because DPB is initially unknown, a value is initially assumed (i.e., estimated; this estimate is replaced with a calculated DPB value in the second and subsequent iterations of this method) for DPB in order to calculate RWB (which is equal to the binder content of the RAP multiplied by DPB). In practice, it is beneficial to estimate a value for DPB that is close to the ultimately-determined degree of binding, in that a close estimate will reduce the number of iterations of this method which must be performed. By way of example, DPB for RAP obtained from freshly-laid asphalt concrete should be expected to be near 100%. Based on experience with this method, it can be beneficial to initially assume a value for DPB of about 60%; however, the method should work regardless of the initially-assumed value.

Step 6. The virgin aggregates are sieved to remove particles able to pass through a US Standard No. 4 (4.75 millimeter) sieve to yield four batches of 5000 grams each of sieve-retained virgin aggregates.

Step 7. The sieved virgin aggregates are rinsed (e.g., with water) to remove any fines that would adhere to the aggregates but which would otherwise pass through the No. 4 sieve.

Step 8. The rinsed virgin aggregates are dried (e.g., in an oven at 350 degrees Fahrenheit) to remove substantially all moisture.

Step 9. The RAP is sieved to remove all particles unable to pass through a US Standard No. 8 sieve (2.36 millimeter) to yield four batches of 5000 grams each of sieved RAP.

Step 10. Four replicate samples are prepared, each including a total of 5000 grams of dried virgin aggregates and sieved RAP, in respective amounts equal to those designed in step 3.

Step 11. The virgin aggregates and the bucket and mixing arm of an asphalt mixer are each heated to 350 degrees Fahrenheit (e.g., in an oven).

Step 12. The sieved RAP and the amount of virgin binder calculated in step 5 are heated to 350 degrees Fahrenheit (e.g., in an oven) for 30 minutes.

Step 13. The heated RAP, virgin binder, and virgin aggregates are mixed for 10 minutes at 350 degrees Fahrenheit (e.g., in an oven) using a mechanical mixer.

Step 14. The mixed components are maintained at 135 degrees Celsius (e.g., in the oven) for two and half hours. During or after this maintenance, each batch is divided into three aliquots.

Step 15. For each batch, the now-binder-coated virgin and RAP aggregates are separated from one another while the batch is maintained at a temperature of about 70-90 degrees Celsius. This can be achieved by sieving the materials through US Standard No. 4 and No. 8 sieves, with the now-binder-coated virgin aggregates being retained above the No. 4 sieve and the now-binder-coated RAP aggregates passing through the No. 8 sieve.

Step 16. Binder is extracted and recovered separately from the each of the separated virgin aggregates and RAP aggregate samples.

Step 17. The SUPERPAVE PG properties and continuous grade are separately determined (as in step 2) for each of i) the blended binder adhered to the RAP aggregate and ii) the blended binder adhered to the virgin aggregates, in each case using the testing procedures specified in AASHTO M320.

Step 18. The proportions of the virgin binder that would be expected to coat each of the RAP aggregate and the virgin aggregates at the zero blending condition are calculated using Bailey's method and estimated based on the surface area of the aggregates at each sieve size.

At the zero blending condition, the virgin binder is coated on both the virgin and RAP aggregates and the RAP binder coats only the RAP aggregates. Based on the measured percentage of binder in the RAP and the sizes of the RAP aggregates, approximate film thickness is calculated around the RAP assuming that there is zero blending. A similar calculation is done to determine film thickness of virgin binder around the RAP aggregates. The ratio of the film thickness of virgin binder and the RAP binder around the RAP aggregates determines the proportions of the RAP-extracted and the virgin binder to be used in the next step.

Step 19: Binder is extracted from RAP (i.e., from RAP alone—not from the RAP that was mixed with virgin aggregates and virgin binder in steps 13-15) and the RAP-extracted binder is blended with virgin binder in the proportion determined from step 18 above. The SUPERPAVE PG properties are determined for this blended binder.

Step 20: Calculate the degree of partial blending from the following equation:

$$\text{Degree of partial blending (\%)} = 100\left(1 - \frac{|A(\text{Virgin\_Agg})_{blend\_binder} - A(\text{RAP\_Agg})_{blend\_binder}|}{|A_{virgin\_binder} - A_{RAP\_virgin\_binder\_0\_blend}|}\right)$$

wherein:

$A(\text{Virgin\_Agg})_{blend\_binder}$=Binder property "A" (e.g., $G^*\sin(\text{delta})$) of blended binder obtained from coated virgin aggregates (i.e., extracted and recovered as described in step 16);

$A(\text{RAP\_Agg})_{blend\_binder}$=Binder property "A" (e.g., $G^*\sin(\text{delta})$) of blended binder obtained from coated RAP aggregate (i.e., extracted and recovered as described in step 16);

$A_{virgin\_binder}$=Binder property "A" (e.g., $G^*\sin(\text{delta})$) of virgin binder (i.e., as determined in step 2); and $A_{RAP\_virgin\_binder\_0\_blend}$=Binder property "A" (e.g., $G^*\sin(\text{delta})$) of the blended binder described in step 19.

Step 21: If the Degree of partial blending determined in step 20 is sufficiently similar to the assumed (i.e., estimated) value of DPB in step 5 then the degree of partial blending has been determined. However, if considerable difference exists between the two values, this process should be repeated, substituting the Degree of partial blending (as determined in step 20) in place of the assumed (i.e., estimated) value of DPB in step 5, and repeating steps 6-21 until the two values agree sufficiently. By way of example, if the difference between the assumed value of DPB and that determined in step 20 (i.e., $|DPB_{Assumed} - DPB_{Determined}|/DPB_{Determined}$) is not greater than about 15%, and preferably not greater than about 10%, then the two values may be considered to agree sufficiently for most pavements. If determination of the actual binder content is considered to be particularly critical for a pavement, then this iterative process can be continued until the two values differ by not more than 5%, 3%, 2%, or less, for example.

Example 2

Prediction Model for Degree of Blending of RAP

A linear regression model was developed to predict degree of blending of RAP. The regression equation is shown below:

$$DOB = 39.756 + 11.592(AC_{RAP}) - 1.433(PP\#200_{RAP}) - 3.764\left[\left(\frac{G^*}{\sin(\delta)}\right)_{RAP\ Binder} - \left(\frac{G^*}{\sin(\delta)}\right)_{Virgin\ Binder}\right]$$

Wherein:

DOB=degree of blending, expressed as a percentage (e.g., DOB 50=50%);

$AC_{RAP}$=asphalt content of RAP (as a percentage by weight);

$PP\#200_{RAP}$=Percentage of RAP (still coated with RAP binder) particles able to pass through a US Standard No. 200 sieve (as a percentage by weight);

$$\left(\frac{G^*}{\sin(\delta)}\right)_{RAP\ Binder} =$$

properties of extracted RAP binder at a selected temperature;

and $$\left(\frac{G^*}{\sin(\delta)}\right)_{Virgin\ Binder} =$$

properties of virgin binder at the same selected temperature.

This relationship has an $R^2$ value of 0.943 and an error of +/-6%. The data from Plants A and B along with the data from the RAP samples were used to develop the model. Originally we included the percent passing the #4 sieve but one of our guidelines for the model was that all parameters should show significance with a 90% confidence level and the #4 sieve did not give enough significance. Another guideline was that all of the relationships in the model made sense. From the model, as the binder content goes up so does the DOB which makes sense as there is more binder to mobilize and mix in bringing the DOB up. As the percent passing the #200 sieve increases, the DOB would begin to drop. This trend made sense as more dust is introduced to the mix the more surface area there is to absorb lowering the DOB. The final part of the model states that as the difference between the two binder stiffness's goes up the lower the DOB goes. As binder ages it gets stiff and with time some of the binder gets to a level of stiffness where it is essentially part of the aggregate. Following this concept, the older the RAP, the less mobile is the RAP binder, which reduces the DOB.

The method of estimating DOB can be used to determine an initial estimate for DPB in step 5 of the method disclosed in Example 1.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A method of making an asphalt concrete mixture that includes a reclaimed asphalt pavement (RAP) and that has a job mix formula (JMF) that specifies an amount of aggregates, gradation of the aggregates, and at least a selected minimum effective binder content (MEBC), the method comprising:

combining a virgin binder, a virgin aggregate, and the RAP in amounts wherein the sum of the amounts of aggregates in the virgin aggregate and the RAP is equal to the amount of aggregates specified in the JMF;

the gradation of aggregates in the combined virgin aggregate and the RAP satisfies the gradation specified in the JMF; and the amount of virgin binder is at least equal to the difference between the MEBC and the working binder content (WBC) of the RAP, wherein the WBC of the RAP is determined by assuming an estimated degree of partial blending (EDPB) for the RAP and then iteratively:

1) determining a virgin binder content (VBC) by subtracting the product (EDPB×total binder content of RAP) from the MEBC;
2) preparing, mixing, and heating above the melting point of the virgin binder a test sample consisting of virgin binder, a coarse fraction of the virgin aggregate, and a fine fraction of the RAP in amounts wherein
   a) the sum of the amounts of the coarse fraction of the virgin aggregate and the fine fraction of the RAP is equal to the amount of aggregates specified in the JMF; and
   b) the amount of virgin binder is VBC;
3) thereafter separating the coarse and fine fractions
4) determining:
   a) a binder property ("A(Virgin_Agg)$_{blend\_binder}$") for binder that coats aggregate in the coarse fraction;
   b) the same binder property ("A(RAP_Agg)$_{blend\_binder}$") for binder that coats aggregate in the fine fraction;
   c) the same binder property ("A$_{virgin\_binder}$") of the virgin binder; and
   d) the same binder property ("A$_{RAP\_virgin\_binder\_0\_blend}$") of a binder sample prepared by combining extracted RAP binder and virgin binder in amounts corresponding to the relative thicknesses of the RAP binder layer and the virgin binder layer that would be expected to coat RAP aggregate particles under zero blending conditions, based on Bailey's calculation method;
5) calculating a calculated degree of partial blending (CDPB) according to the following formula Degree of partial blending (%) =
$$100\left(1 - \frac{|A(\text{Virgin\_Agg})_{blend\_binder} - A(\text{RAP\_Agg})_{blend\_binder}|}{|A_{virgin\_binder} - A_{RAP\_virgin\_binder\_0\_blend}|}\right)$$

6) comparing EDPB and CDPB and
   a) if (|CDPB−EDPB|/CDPB) is not greater than 0.15, then calculating WBC as the product (CDPB×total binder content of RAP) or else
   b) setting EDPB equal to CDPB and repeating steps 1-6.

2. The method of claim 1, wherein the asphalt concrete mixture includes at least 25% by weight RAP.

3. The method of claim 1, wherein the asphalt concrete mixture includes at least 35% by weight RAP.

4. The method of claim 1, wherein the binder property is selected from the group consisting of G*, delta, and (G*× sin(delta)).

5. The method of claim 1, wherein the binder property is G*/sin(delta).

6. The method of claim 1, wherein EDPB is assumed to be 60%.

7. The method of claim 1, where EDPB is initially assumed to be DOB, wherein $$DOB = 39.756 + 11.592(AC_{RAP}) - 1.433(PP\#200_{RAP}) - 3.764\left[\left(\frac{G^*}{\sin(\delta)}\right)_{RAP\ Binder} - \left(\frac{G^*}{\sin(\delta)}\right)_{Virgin\ Binder}\right]$$

and wherein:
$AC_{RAP}$ is the asphalt content of the RAP, expressed as a percentage by weight;
$PP\#200_{RAP}$ is the percentage of the RAP particles able to pass through a US Standard No. 200 sieve, expressed as a percentage by weight;

$$\left(\frac{G^*}{\sin(\delta)}\right)_{RAP\ Binder}$$

is a property of RAP binder at a selected temperature; and $$\left(\frac{G^*}{\sin(\delta)}\right)_{Virgin\ Binder}$$

is a property of the virgin binder at the same selected temperature.

8. The method of claim 1, wherein the asphalt concrete mixture is a hot mix asphalt.

9. The method of claim 1, wherein the asphalt concrete mixture is a warm mix asphalt.

10. The method of claim 1, wherein the virgin binder is an asphalt.

11. The method of claim 1, wherein the virgin binder is a polymer-supplemented asphalt.

12. The method of claim 1, wherein, in step 6
   a) if (|CDPB−EDPB|/CDPB) is not greater than 0.10, then calculating WBC as the product (CDPB×total binder content of RAP) or else
   b) setting EDPB equal to CDPB and repeating steps 1-6.

13. The method of claim 1, wherein, in step 6
   a) if (|CDPB−EDPB|/CDPB) is not greater than 0.05, then calculating WBC as the product (CDPB×total binder content of RAP) or else
   b) setting EDPB equal to CDPB and repeating steps 1-6.

14. The method of claim 1, further comprising paving a surface using the asphalt concrete mixture.

15. A pavement made by heating and compressing an asphalt concrete mixture made according to the method of claim 1.

* * * * *